_United States Patent Office_

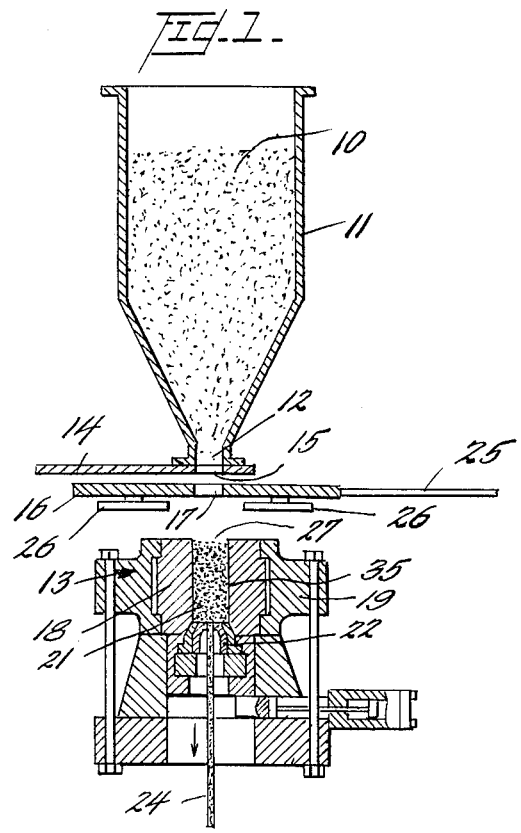
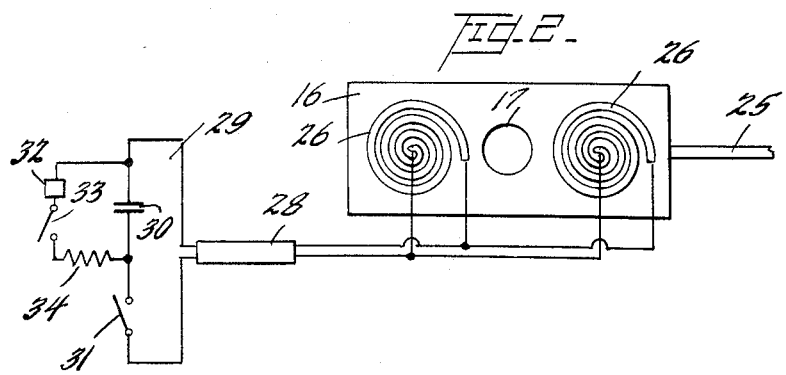

3,232,087
Patented Feb. 1, 1966

3,232,087
EXTRUSION SYSTEM
Bruce L. Baxter, Richmond, Va., assignor to Reynolds Metals Company, Richmond, Va., a corporation of Delaware
Filed Jan. 23, 1964, Ser. No. 339,688
7 Claims. (Cl. 72—56)

This invention relates to novel apparatus for the extrusion of continuous lengths of solid metal from particles of extrudable metal. More particularly, the invention relates to apparatus in which continuous lengths of aluminous metal are extruded from a die under pressure supplied by a magnetic field of high flux density.

Extrusions of aluminous metal, by which is means aluminum and alloys thereof containing at least 51 percent of aluminum, are conventionally produced by subjecting reheated cast billets to sufficient pressure to force the metal to flow plastically through a die orifice, forming a product whose cross-section, shape and size, conform to that of the orifice. In order to insure uniform quality in the extruded products, it is necessary closely to control the extrusion speeds, temperatures and pressures. A major limitation of the conventional process arises in connection with the production of complicated shapes which often involve nonuniform metal flow. Uniform metal flow can readily be obtained where a simple round or symmetrical orifice is employed. Where both heavy sections and thin sections may be present, nonuniform friction on the die walls tends to produce nonuniform flow. In order to overcome frictional resistance and to attain rapid production rates, high pressures are required, and these are restricted by the inherent design features of presently known extrusion devices.

In accordance with the present invention there is provided a novel apparatus for metal extrusion employing as the source of extrusion pressure a magnetic field of high flux density.

Devices which employ the energy acquired from a varying magnetic field, and particularly a field of high flux density, for forming and shaping metals are known, and are described, for example, in U.S. Patents 2,976,907 and 3,108,325.

The apparatus of the present invention utilizes the principle that the exposure of a conductor to a varying magnetic field induces a current in the conductor, subjecting the conductor to a force arising from the interaction between the induced current and the magnetic field. If the conductor is confined within a mold or die exposed to the magnetic field and a sufficient amount of energy is transferred to the conductor, the pressure on the metal positioned in the magnetic field will cause it to flow and assume the configuration of the mold or die. A series of successive impulses may thus be applied to the conductor or metal in the die providing an instantaneous pressure of great magnitude, exceeding the elastic limit of the metal and causing the metal to flow through the die and out of the die orifice. The amount of work thus performed on the metal in the extrusion die depends on a number of factors, including the magnetic field strength, flux density, the mass and position of the metal relative to the magnetic field and the frequency with which the magnetic field is varied.

The mode of operation of the apparatus of the invention will be described with particular reference to the extrusion of aluminous metal, as defined above, but it will be understood that the apparatus may also be employed for the extrusion of other extrudable metals which possess suitable properties of conductivity and plastic flow. Aluminous metals, although nonmagnetic, possess high electrical conductivities.

In the production of aluminous metal extrusions with the apparatus of the invention, the aluminous metal is advantageously employed in the form of cast particles. Such cast particles are of a free flowing shape and are prepared preferably by centrifugal casting, for example, by continuously pouring molten aluminous metal into the top of a cylindrical pot revolving about a vertical axis and having side openings through which the molten metal is thrown radically outwardly from the pot as a result of its centrifugal action. In lower ranges of speeds the particles are found to be spheroidal, and in higher ranges of speeds the particles are smaller and assume an acicular shape. The particles at least partially solidify in the air and can be fully air cooled or else caught in a container of water. Such cast particles are readily consolidated into continuous lengths of solid aluminous metal. Their preparation is more fully described in U.S. Patent 2,994,-102.

It is accordingly an object of the invention to provide an apparatus for the extrusion of extrudable metal, and particularly aluminous metal, employing as a source of energy for application to the metal, a magnetic field of high flux density.

It is a further object of the invention to provide an apparatus of the character described which is adapted to form continuous lengths of extrudable metal supplied thereto in the form of free flowing cast particles.

These free flowing cast particles permit the extrusion of alloys not hitherto obtainable by conventional extrusion processes inasmuch as a multiplicity of combinations of different alloy particles, or even combinations of different metals, plastics, or other metal combinations is possible.

For a better understanding of the invention and its other objects, details, and advantages, reference is now made to the present preferred embodiments of the invention which are shown, for purposes of illustration only, in the accompanying drawing.

In the drawings,

FIGURE 1 is a schematic view, in side elevation, of an apparatus for extruding aluminous or other extrudable metals from cast particles of such metals;

FIGURE 2 is a plan view of the underside of the magnetic coil supporting member.

Referring now to the drawings, and initially to FIG. 1, the illustrated apparatus receives aluminous metal cast particles 10 in a hopper 11, provided with a discharge opening 12, said hopper being positioned above an extrusion assembly shown generally at 13. The metal particles may be preheated by any suitable means before they are fed into hopper 11, or they may be heated while in the hopper, to provide the optimum particle temperature for consolidation in the extruder.

The hopper 11 is further provided with a sliding plate 14 having an opening 15 so that when sliding plate 14 is moved laterally, opening 15 will be in registry with discharge opening 12, permitting metal particles to be fed to the extruding device, or permitting the feed to be shut off, as desired.

Positioned between the hopper 11 and the extrusion means 13, is a magnetic coil supporting member 16, described more fully below. Coil supporting member 16 is provided with a centrally located opening 17 through which metal particles can be fed into the extrusion device, as desired, and which will be in registry with the discharge opening 12 and the opening 15 in sliding plate 14.

The extrusion means 13 represents a modification of the conventional hydraulic pressure operating extrusion devices, adapted to be combined with the hopper 11 and the magnetic flux pressure applying means of the invention. It includes a liner 18 positioned within container 19. Metal particles fed into the liner 18 from hopper 11 become consolidated by pressure forming metal mass 21, which being in plastic condition, flows downward into the opening of extrusion die 22, which may be of any desired cross-section. Die 22 is held in place by a conventional arrangement of a die bearing plate, die holder, die block or bolster, and hydraulically operated lock plate, comprising the remainder of the extrusion assembly 13.

A continuous length of extruded metal 24 emerges from the die orifice and is cut off in desired lengths.

Referring now to FIG. 2, there is shown the arrangement for supplying pressure to the metal particles in the extrusion device by means of a magnetic field. Magnetic coil supporting plate 16 is provided with reciprocating means 25 whereby either of the magnetic coils 26, or the opening 17 may be positioned above the entrance 27 of the extrusion device 13. In the arrangement shown, a pair of magnetic coils 26 are located at the outer ends of the member 16. These coils 26 comprise a conductor or solenoid, such as copper strip, wound in the form of a flat spiral. Each spiral is connected through a coaxial cable 28 to a pulsing network 29, for varying the magnetic field surrounding coils 26. Network 29 includes high capacity condenser 30 in series with switching means 31 such as an ignitron or thyratron. The condenser 30 may be charged by means of a suitable high voltage supply 32 which is connected to the condenser through switch means 33 and current limiting resistor 34.

The operation of the extrusion apparatus is as follows:

The hopper 11 is charged with heated aluminous metal cast particles and a charge of said particles is allowed to flow by gravity through discharge openings 12 and 15, and through opening 17 of the coil holding plate 16 into the entrance 27 of the extrusion chamber. Sliding plate 14 is then moved to close the discharge opening of hopper 11. Coil bearing member 16 is then moved so that one of the coils 26 is directly over the opening 27 of the extrusion apparatus. In this relation, sliding plate 14 further serves to cover the hopper discharge opening 12, while at the same time serving as a back up plate to absorb the reactive forces created when the coil 26 is activated. By passing a current pulse through coil 26, a high flux density magnetic field is set up almost instantaneously, thus discharging a measured amount of energy from the coil across the air gap onto the top of the charge of metal particles in the extrusion chamber or cylinder. The resulting pressure on the metal particles, which depend upon the duration of the pulse, is very great, being in excess of the elastic limit of the metal, and causing the metal particles to fuse into a plastic mass which flows into the die opening, and continues to flow through the die even after the termination of the impulse. In this manner, the aluminous metal mass is extruded through the die opening to produce cable or any other desired shape. The length of the extrusion chamber is such that the consolidated face 35 of the aluminous metal particles is maintained at a substantially fixed distance, e.g. about three inches, above the die opening. It can be estimated that, for example, 10 kilojoules of energy with a force of only about 13,000 lbs. per square inch will readily extrude pure aluminum in a chamber 1" x 6" to produce ¼" diameter wire. It is possible to design magnetic coils of a permanent type to produce as much as 50,000 p.s.i. Other types of coils can produce considerably higher pressures.

In the second portion of the repetitive operation of the apparatus, sliding plate 14 and coil carrier plate 16 are both moved so that their respective openings 15 and 17 are in registry with discharge opening 12 of the hopper, thus permitting another charge of metal particles to enter die entrance opening 27. Plate 14 is then moved into cutoff position, and the other coil 26 is moved into position above die entrance 27, and the coil is energized as before. This operation may be repeated successively, utilizing each coil 26 alternately, to produce a continuously extruded product. The movements of sliding plate 14 and of the coil carrier 16 may be controlled by a suitable timing device so that a measured amount of metal particles would be charged into the extrusion die chamber with each cycle. Among the advantages of the apparatus of the invention is the elimination of air entrapment, which is a problem with conventional extrusion presses.

It will be readily understood by persons skilled in the art that although the apparatus of the invention has been shown, for purposes of illustration, utilizing a single die chamber and a pair of conductor coils, that a multiplicity of die chambers and/or coil arrangements may be employed. Thus, for example, three, four, five, six or more coils in a single tank arranged in a cylindrical or other geometric system may be used. Also a corresponding number of separate die chambers may be used all discharging into the one or more outlets. In this type of arrangement the sliding plate 16 would not be necessary since the coils and die chambers would be in a permanently fixed position. The firing sequence could thus be arranged in such a manner as to provide a continuous flow of the finished extruded product. It will be further understood that the extruded products may include any desired shapes such as sheet, rod, and other configurations.

The apparatus of the invention also contemplates a dual arrangement similar to a double acting pump, wherein the two coils are placed in the center beneath the metal particle feed, the coils being arranged back to back, with die chambers opposing the respective coils in a horizontal plane. This arrangement enables the reacting forces on the coils to counter-balance each other, thus substantially reducing the total stress on the apparatus.

It has been found further, in accordance with the invention, that the placing of a small thin aluminous metal disc on top of the pellet charge in the die chamber improves the action of the magnetic field by aiding in the uniform distribution of the force, thereby overcoming any tendency toward momentary formation of eddy currents by reason of discontinuity in the pellet surfaces. The aluminous metal discs are composed of aluminum or of the same alloy as the pellets. Upon firing the disc uniformly distributes the extension force over the surface of the pellets and then blends in with the pellet material. These discs can, for example, be automatically fed into position by conventional mechanical means to coincide with the timing of the extrusion cycle.

What is claimed is:

1. Apparatus for the extrusion of continuous lengths of solid extrudable metal from free flowing particles of said metal comprising in combination, an extrusion die, means for feeding metal particles to said die, and means located between said feeding means and said extrusion die for applying pressure to metal particles in said die to consolidate said metal particles to a flowable metal mass and to force said mass through said die comprising a conductor shaped to provide a predetermined magnetic field, and pulse means for applying a current to said conductor to energize said conductor with formation of a magnetic field of high flux density.

2. Apparatus for the extrusion of continuous lengths of solid aluminous metal from free flowing particles of said metal comprising, in combination, an extrusion die, means for feeding metal particles to said die comprising a sliding plate having an opening permitting passage therethrough of metal particles, and means located between said feeding means and said extrusion die for applying pressure to metal particles in said die to consolidate said metal particles to a flowable metal mass and to force said mass through said die comprising a reciprocating plate provided with a centrally located opening permitting passage of metal particles into said die and with at least one conductor located on each side of said opening to provide a predetermined magnetic field directed toward said die, and pulse means for applying a current alternatively to said conductors to energize the conductors with formation of a magnetic field of high flux density.

3. The apparatus of claim 1 in which the conductor has the shape of a flat spiral.

4. The apparatus of claim 2 in which the conductors have the shape of flat spirals.

5. The apparatus of claim 1 in which the metal particle feeding means comprises a hopper having a bottom discharge opening provided with a sliding closure plate having an opening therein to permit downward flow of metal and other particles when said opening is in registry with said discharge opening.

6. The apparatus of claim 5 in which the metal particle feeding means is positioned with its discharge opening above the supply opening of the extrusion die.

7. The apparatus of claim 2 which is further provided with means for moving said reciprocating plate to position its central opening and each of its conductors successively above said die.

References Cited by the Examiner

"Magneform" Brochure, published by General Dyamics Corp., General Atomic Division, May 29, 1962. Copy in Group 320, class 72, sub. 56, (8 pages).

CHARLES W. LANHAM, *Primary Examiner.*